(12) United States Patent
Esposito

(10) Patent No.: US 10,240,621 B2
(45) Date of Patent: Mar. 26, 2019

(54) VALVE POSITIONER HAVING BYPASS COMPONENT AND CONTROL VALVE COMPRISED THEREOF

(71) Applicant: Dresser, Inc., Addison, TX (US)

(72) Inventor: Sandro Esposito, Katy, TX (US)

(73) Assignee: Dresser, LLC, Houston, TX (US)

( * ) Notice: Subject to any disclaimer, the term of this patent is extended or adjusted under 35 U.S.C. 154(b) by 119 days.

(21) Appl. No.: 15/155,129

(22) Filed: May 16, 2016

(65) Prior Publication Data

US 2016/0258453 A1 Sep. 8, 2016

Related U.S. Application Data

(62) Division of application No. 13/937,823, filed on Jul. 9, 2013, now Pat. No. 9,404,515.

(51) Int. Cl.
| | |
|---|---|
| *F15B 21/08* | (2006.01) |
| *F15B 5/00* | (2006.01) |
| *G05B 19/43* | (2006.01) |
| *F15B 15/20* | (2006.01) |

(52) U.S. Cl.
CPC .............. *F15B 21/08* (2013.01); *F15B 5/006* (2013.01); *F15B 15/202* (2013.01); *G05B 19/43* (2013.01); *Y10T 137/7761* (2015.04)

(58) Field of Classification Search
CPC ........ F15B 21/08; F15B 15/202; F15B 5/006; G05B 19/43; Y10T 137/7761
USPC ..................................................... 251/129.04
See application file for complete search history.

(56) References Cited

U.S. PATENT DOCUMENTS

| | | | |
|---|---|---|---|
| 2,964,051 A | 12/1960 | Garnett | |
| 3,266,379 A | 8/1966 | Kreuter | |
| 3,894,394 A | 7/1975 | Braytenbah et al. | |
| 3,936,754 A | 2/1976 | Minami | |
| 4,096,699 A | 6/1978 | Ziteili | |
| 4,492,246 A | 1/1985 | Prescott et al. | |
| 5,538,036 A | 7/1996 | Bergamini et al. | |
| 5,570,869 A | 11/1996 | Diaz et al. | |
| 5,651,385 A | 7/1997 | Karte | |
| 5,769,120 A | 6/1998 | Laverty et al. | |
| 6,269,838 B1 | 8/2001 | Woodworth et al. | |
| 6,272,401 B1 * | 8/2001 | Boger ..................... | F15B 5/006 700/282 |
| 6,519,508 B1 | 2/2003 | Saito | |
| 6,862,547 B2 | 3/2005 | Snowbarger et al. | |
| 2004/0236472 A1 | 11/2004 | Junk et al. | |

(Continued)

FOREIGN PATENT DOCUMENTS

WO WO-99-05576 2/1999

OTHER PUBLICATIONS

European Search Report and Opinion issued in connection with corresponding EP Application No. 14176200 dated May 13, 2015.

*Primary Examiner* — John Bastianelli
(74) *Attorney, Agent, or Firm* — Paul Frank + Collins P.C.

(57) ABSTRACT

A valve positioner that can maintain operation of the control valve despite failures in one or more components. The valve positioner may reduce downtime by allowing in-situ repair to occur on the valve positioner. The valve positioner may incorporate a by-pass component, which can utilize control input signals (e.g., a 4-20 mA signal) to energize one or more components (e.g., a current-to-pressure converter) to cause the control valve to modulate fluid flow without the digital microprocessor and/or related components.

10 Claims, 7 Drawing Sheets

(56) References Cited

U.S. PATENT DOCUMENTS

| | | |
|---|---|---|
| 2005/0030186 A1 | 2/2005 | Huisenga et al. |
| 2006/0266966 A1 | 11/2006 | Karte et al. |
| 2007/0191989 A1 | 8/2007 | Esposito et al. |
| 2008/0099069 A1* | 5/2008 | Cook .................. F15B 13/0402 251/129.04 |
| 2008/0163937 A1 | 7/2008 | Esposito |
| 2008/0269951 A1 | 10/2008 | Boger |
| 2010/0229975 A1 | 9/2010 | Sweeney et al. |
| 2012/0216898 A1 | 8/2012 | Carter et al. |
| 2012/0228530 A1 | 9/2012 | Junk |

* cited by examiner

US 10,240,621 B2

VALVE POSITIONER HAVING BYPASS COMPONENT AND CONTROL VALVE COMPRISED THEREOF

CROSS-REFERENCE TO RELATED APPLICATIONS

This application is a division of U.S. Ser. No. 13/937,823, filed on Jul. 9, 2013, and entitled "VALVE POSITIONER HAVING BYPASS COMPONENT AND CONTROL VALVE COMPRISED THEREOF," the content of which is incorporated herein by reference in its entirety.

BACKGROUND

The subject matter disclosed herein relates to control valves and, in particular, to embodiments of a valve positioner for control valves.

Control valves regulate transmission and distribution of fluids (e.g., liquids and gases). These devices integrate into process control systems in a wide variety of industries. Examples of process control systems form a control loop with remote sensors and other feedback elements to monitor process conditions (e.g., temperature, pressure, etc.). The control loop can generate signals that cause the control valve to modify the flow of fluid in response to changes in the process conditions.

Many control valves integrate valve positioners with digital components (e.g., microprocessors) that can process these signals. These digital components afford the control valve with precise control and functionality. Certain types of digital components can also expand data processing and communication capabilities of the valve positioner. These features can improve the quality, accuracy, and speed of the control valve to respond to changes in the process conditions.

Unfortunately, although digital-based valve positioners are more powerful and accurate than conventional mechanical and/or early digital devices, these types of valve positioners still have reliability issues and can fail. Failures often lead to valve downtime for repair and/or replacement of the defective components. More important, however, is that failures that require maintenance of the control valve can render the process system inoperable for extended periods of time. The resulting downtime can lead to expensive production delays and, possibly, run afoul of regulations set forth by any number of government organizations (e.g., the Environmental Protection Agency (EPA), the Occupational Safety and Health Administration (OSHA), etc.).

Most solutions that address the reliability of digital components provide little relief to shorten, or to avoid, downtime of control valves that utilize digital-based valve positioners. For example, some control valves may integrate a mechanical actuator that can change fluid flow in lieu of the digital components. The mechanical actuator does not operate automatically in this configuration. Rather, maintenance and/or operations personnel must intervene to manually operate the mechanical actuator. Other solutions integrate solenoids with the valve positioner to modulate the flow of fluid through the control valve. However, solenoids provide only binary operation (e.g., on/off), which does not allow finite modulation of flow through the control valve. On the other hand, still other solutions include redundant control valves and/or fluid circuits into the process system. The control system and/or operations personnel can divert flow into these redundant circuits to maintains operation of the process in parallel with repair of the defective control valves. Although effective to remedy potential downtime, these redundant systems still require additional hardware and software that can add significant component cost and complexity to the process line and control system.

SUMMARY

This disclosure describes improvements in valve positioners that allow control valves to continue to operate despite failures in one or more digital components (e.g., the microprocessor). These improvements reduce downtime by allowing in-situ repair to occur on the valve positioner. As set forth more below, this disclosure presents various embodiments of a valve positioner that incorporates a by-pass component, which can utilize control input signals (e.g., a 4-20 mA signal) to maintain operation of the control valve to modulate fluid flow without the digital microprocessor and/or related components.

BRIEF DESCRIPTION OF THE DRAWINGS

Reference is now made briefly to the accompanying figures, in which.

Where applicable like reference characters designate identical or corresponding components and units throughout the several views, which are not to scale unless otherwise indicated.

DETAILED DESCRIPTION

Figure 1:
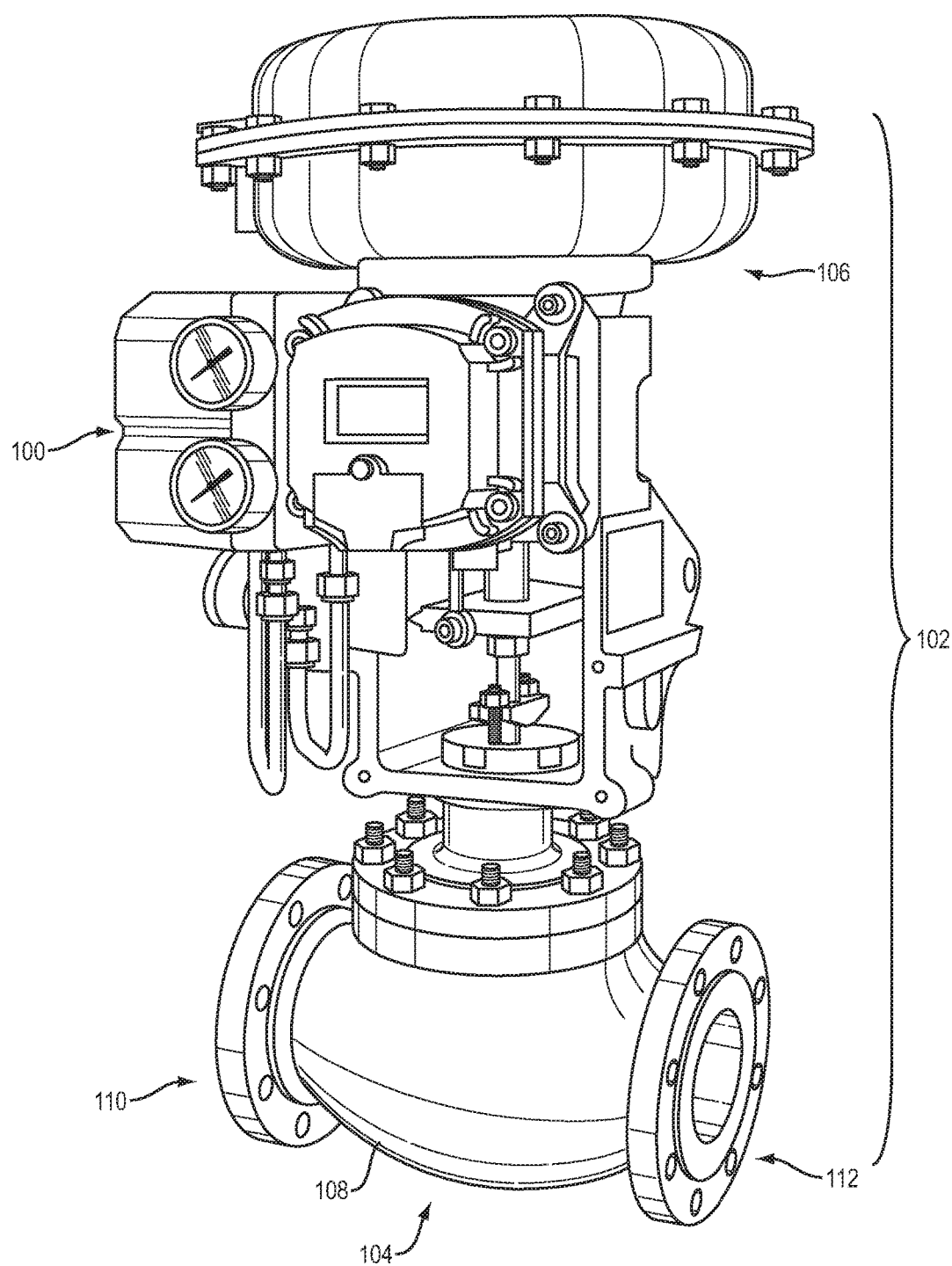
FIG. 1 depicts a perspective view of an exemplary embodiment of a valve positioner as part of a control valve.
Figure 2:
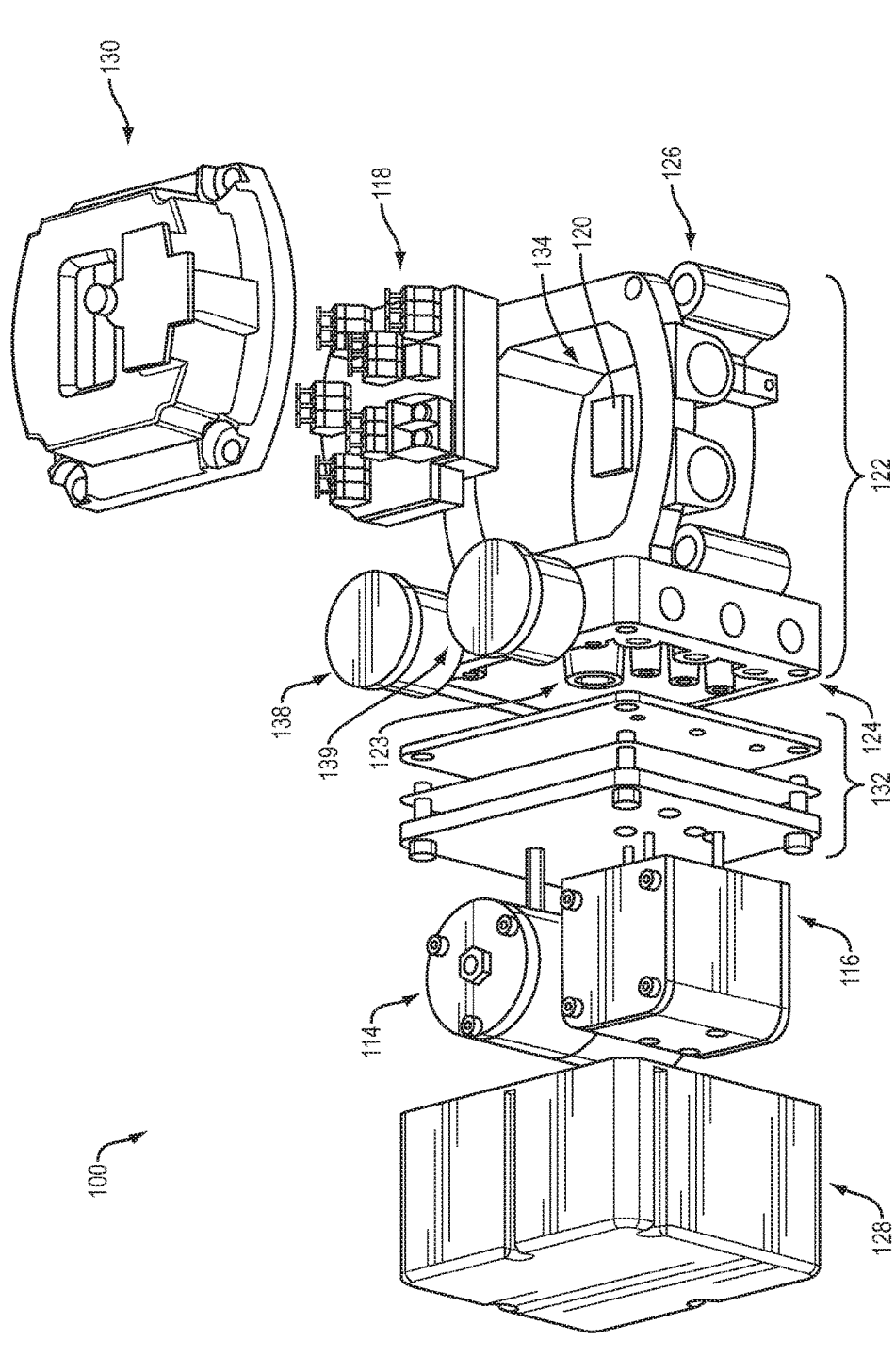
FIG. 2 depicts a perspective, exploded assembly view of the valve positioner of FIG. 1.

FIGS. 1 and 2 illustrate an exemplary embodiment of a valve positioner 100 with by-pass features that continue to modulate fluid flow during on-line maintenance and repair. In FIG. 1, the valve positioner 100 is part of a control valve 102 with a fluid coupling 104 and an actuator 106. These components of the control valve 102 work in combination with the valve positioner 100 to control one or more process conditions (e.g., flow, pressure, temperature, etc.) that relate to fluid flow through the fluid coupling 104. As shown in the diagram, the fluid coupling 104 has a body 108 with a first inlet/outlet 110 and a second inlet/outlet 112. The fluid coupling 104 can also have a valve, which is not shown in the diagram of FIG. 1. The valve resides in the body 108. The actuator 106 couples with the valve to change the position of the valve (e.g., from a first valve position to a second valve position). The change in position modulates fluid flow across the first inlet/outlet 110 and the second inlet/outlet 112. In one implementation, the valve positioner 100 couples with the actuator 106 to cause the actuator 106 to change the valve position in response to one or more input control signals the valve positioner 100 receives from a remote device (e.g., a central process control module and/or sensors that monitor changes in the process conditions upstream and downstream of the control valve 102).

FIG. 2 depicts the valve positioner 100 in exploded form. As shown in this diagram, the valve positioner 100 has a plurality of valve components (e.g., a converter component 114, a relay component 116, a processing component 118). The valve components 114, 116, 118 work in combination to maintain the position of the valve that modulates fluid flow across the control valve 102 (FIG. 1). The valve positioner 100 also includes a by-pass component, identified by the numeral 120. Examples of the by-pass component 120 form an analog circuit and/or device that forgoes use of digital components. This design offers robust performance and high reliability relative to components and construction, e.g., of the processing component 118. For example, as discussed more below, the by-pass component 120 is compatible with the various protocols for the input control signals in use to operate the control valve 102 (FIG. 1) in process control systems.

Broadly, the by-pass component 120 couples with the processing component 118 and with the remote device. This configuration couples the by-pass component 120 with the input control signal that instructs the correct position of valve in the control valve 102 (FIG. 1). Examples of the by-pass component 120 can operate in one or more operating modes that defines how the input control signal conducts to the valve components in response to component failure. For example, during normal operating conditions (i.e., no component failures), the by-pass component 120 operates in a first mode. In this first mode, the by-pass component 120 conducts the input control signal, or a derivation thereof, from the processing component 118 to the other valve components (e.g., the converter component 114). This configuration manages operation of the valve components to achieve the appropriate modulation of fluid flow across the control valve 102 (FIG. 1).

If a failure occurs, i.e., if the processing component 118 fails and/or other operating deviations of the control valve 102 (FIG. 1) are detected, the by-pass component 120 can operate in a second mode that permits the by-pass component 120 to conduct the input control signal, or a derivation thereof, directly to the valve components. To this end, the input control signal effectively by-passes the processing component 118. This configuration maintains operation of control valve 102 (FIG. 1) to modulate the flow of fluid, but without the processing and functionality of the processing component 118.

Examples of the by-pass component 120 can maintain the functionality of the control valve 102 (FIG. 1) to modulate fluid flow during on-line maintenance and repair. Operating the by-pass component 120 in the second mode, for example, effectively decouples the processing component 118 from operation of the valve components. This feature permits an end user (e.g., a technician) to remove, replace, and/or repair the processing component 118 and/or other digital components (e.g., sensors) on the control valve 102 (FIG. 1) without disruption to fluid flow and, ultimately, the process system (and process control system) that integrates the control valve 102 (FIG. 1).

Referring back to FIG. 2, the valve positioner 100 has a housing 122 with housing openings 123 and one or more mounting locations (e.g., a first mounting location 124 and a second mounting location 126). One or more covers (e.g., a first cover 128 and a second cover 130) can secure with the housing 122 at the mounting locations 124, 126. Examples of the covers 128, 130 enclose the valve components, thereby protecting the valve components from conditions prevailing in the environment surrounding the control valve 102 (FIG. 1). At the first mounting location 124, the valve positioner 100 includes an interface component 132 that resides at least partially between the housing 120. The interface component 132 can include various layers of material (e.g., insulators, mounting plates, etc.). This construction can secure, retain, and/or protect one or both of the converter component 114 and the relay component 116. In one example, the housing 122 has a compartment 134 that can receive the processing component 118 and/or the by-pass component 120. The valve positioner 100 also includes one or more gauges (e.g., a first gauge 136 and a second gauge 138) that can provide an indication of the flow conditions (e.g., pressure, flow rate, etc.) of fluid, e.g., compressed air, that the valve positioner 100 uses to operate the valve in the control valve 102 (FIG. 1).

In one embodiment, the converter component 114 can comprise a current-to-pressure (I/P) converter. This device converts an analog signal to a proportional linear pneumatic output. The pneumatic output corresponds to a pressure value, which in turn can control pneumatic actuators/operators and pneumatic valves. As shown in the example of FIG. 2, the relay component 116 can receive the pneumatic output. Examples of the relay component 116 include switching devices and, in one particular example, pneumatic relays that change position in response to the pneumatic output, e.g., open and close in response to compressed air. In one example, the position of the relay component 116 can regulate the position of the valve. This feature modulates the flow of fluid through the control valve 102 (FIG. 1).

The processing component 118 manages operation of the control valve 102 (FIG. 1). Examples of the processing component 118 can comprise one or more discrete components (e.g., resistors, transistors, capacitors, etc.) that reside on one or more substrates (e.g., a printed circuit board). These components may include a processor (e.g., an ASIC, FPGA, etc.) that can execute executable instructions in the form of software and firmware. These executable instructions can be stored on memory. In one embodiment, the processing component 118 can include one or more programmable switches, inputs that couple with sensors for position feedback, a proportional-integral-derivative (PID) controller, a display (e.g., an LCD display), and like components that facilitate use and operation of the control valve 102 (FIG. 1).

Figure 3:
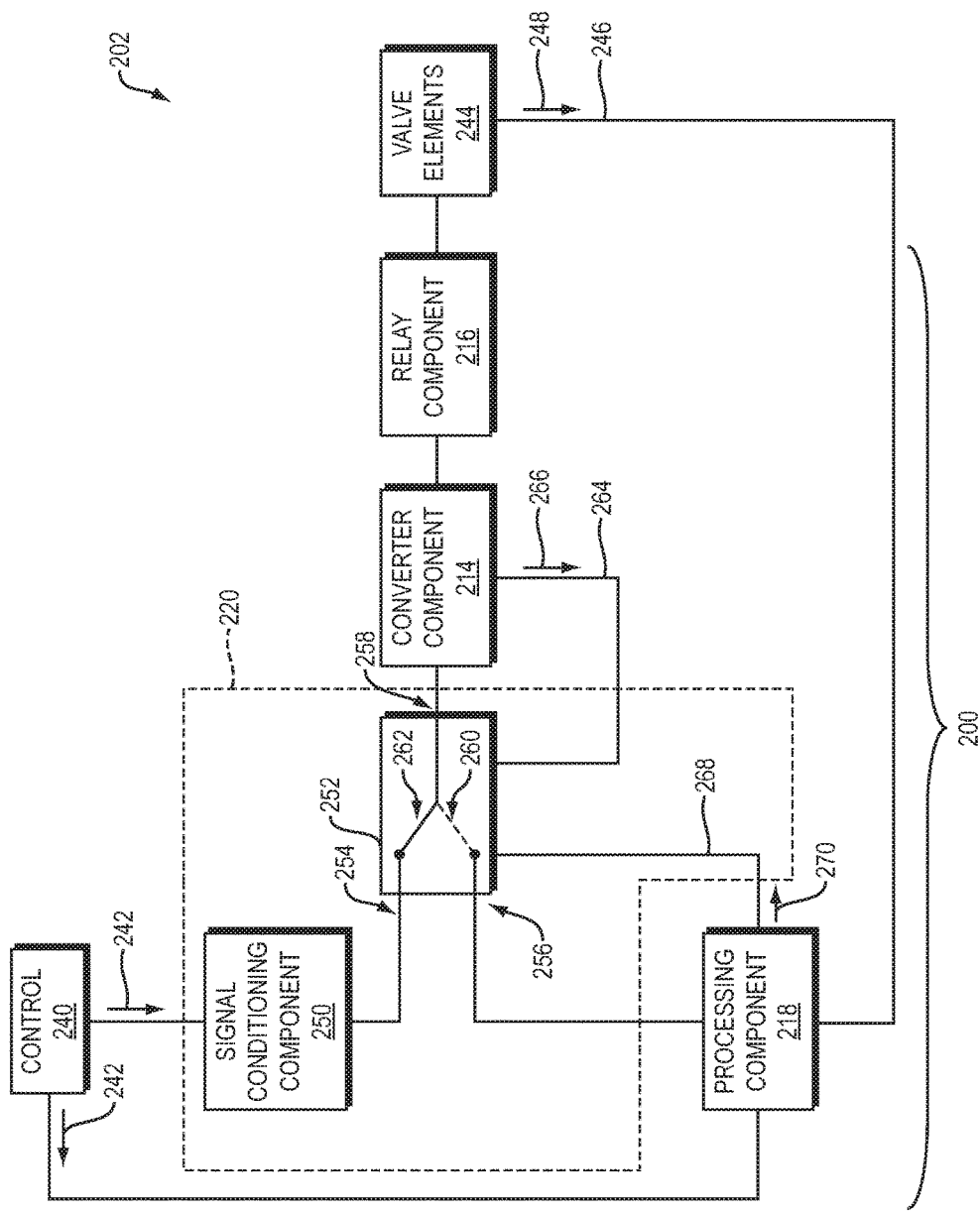
FIG. 3 depicts a schematic diagram of an exemplary embodiment of a valve positioner for use with a control valve (e.g., the control valve of FIG. 1)

FIG. 3 depicts a schematic diagram of a valve positioner 200 to further describe operation among the various operating modes of the by-pass component 220. In the example of FIG. 3, the valve positioner 200 couples with a remote device 240 that provides a control input signal 242. Examples of the control input signal 242 conform to a variety of protocols, e.g., 4-20 mA, 10-50 mA, Fieldbus, and Modbus®. The valve positioner 200 also couples with valve elements 244, which modulate the fluid flow through the control valve 202. In one example, the valve elements 244 couple with the relay component 216 and with the processing component 218. A first feedback loop 246 can generate a first feedback signal 248 to the processing component 218 that contains data about the operation condition of the valve 244 and/or the control valve 202 in general.

As also shown in FIG. 3, the by-pass component 220 includes a signal conditioning component 250 and a signal switching component 252 with one or more inputs (e.g., a first input 254 and a second input 256) and one or more outputs (e.g., a first output 258). The signal switching component 252 can operate among a plurality of operating states (e.g., a first operating state 260 and a second operating state 262). In one embodiment, the valve positioner 200 includes a second feedback loop 264 that communicates a second feedback signal 266 between the converter component 214 and the switching component 252. The valve positioner 200 also includes an operating loop 268 that communicates an operating signal 270 between the processing component 218 and the switching component 252.

Examples of the operating states 260, 262 of the signal switching component 252 correspond with the operating modes which, as discussed above, determine how the input control signal 242 conducts, e.g., to the converter component 214. The first operating state 260 places the by-pass component 220 in the first operating mode, thereby conducting the input power signal 242 from the processing component 218 to the converter component 214. On the other hand, the second operating state 262 places the by-pass component 220 in the second operating mode, which conducts the input power signal 242 from the signal conditioning component 250 to the converter component 214.

The operating signal 270 from the processing component 218 can cause the signal switching component 252 to change between the operating states 260, 262. Examples of the operating signal 270 can have one or more assigned parameters (e.g., voltage, current, etc.). These assigned parameters can change, e.g., in response to failure of the processing component 218 and/or changes in operation of the control valve 202. For example, the voltage and/or current of the operating signal 270 can change from a high level to a low level, and vice versa. The high level may correspond to the first operating state 260 and, accordingly, operation of the by-pass component 220 in the first mode to conduct the input power signal from the processing component 218. In another example, the low level may indicate failure and/or errors in operation of the control valve 202. In response to the low level, the signal switching component 252 may enter the second operating state 262, which causes the by-pass component 220 to operate in the second mode to conduct the input power signal from the signal conditioning component 250 to the converter component 214.

The first feedback signal 248 can, in one embodiment, dictate the level of the operating signal 270. Examples of the first feedback signal 248 can arise from one or more sensors that reside in and/around the valve 244 and throughout the control valve 202. These sensors can track the position and/or travel of the valve 244, flow properties (e.g., velocity, rate, pressure, etc.), and other parameters that define operation of the control valve 202. The first feedback signal 248 can contain data that defines one or more values for these parameters. In one example, the processing component 218 can compare these values to a threshold criteria to detect problems in operation. If the values do not satisfy the threshold criteria, then the processing component 218 can cause the level of the operating signal 270, which, in turn, modifies the operating state 260, 262 of the signal switching component 252.

As shown in FIG. 3, the remote device 240 can deliver the input control signal 242 to one or both of the processing component 218 and the signal conditioning component 250. Examples of the signal conditioning component 250 can modify properties of the input control signal 242 to comport with construction of the signal switching component 252. As mentioned above, this construction may require the input control signal 242 to utilize analog, rather than digital, parameters. To this end, and in one example, configurations of the signal conditioning component 250 may modify signals that use the Fieldbus and Modbus® protocols into one or more signals with corresponding analog parameters that are compatible with operation, e.g., of the converter component 214.

Figure 4:
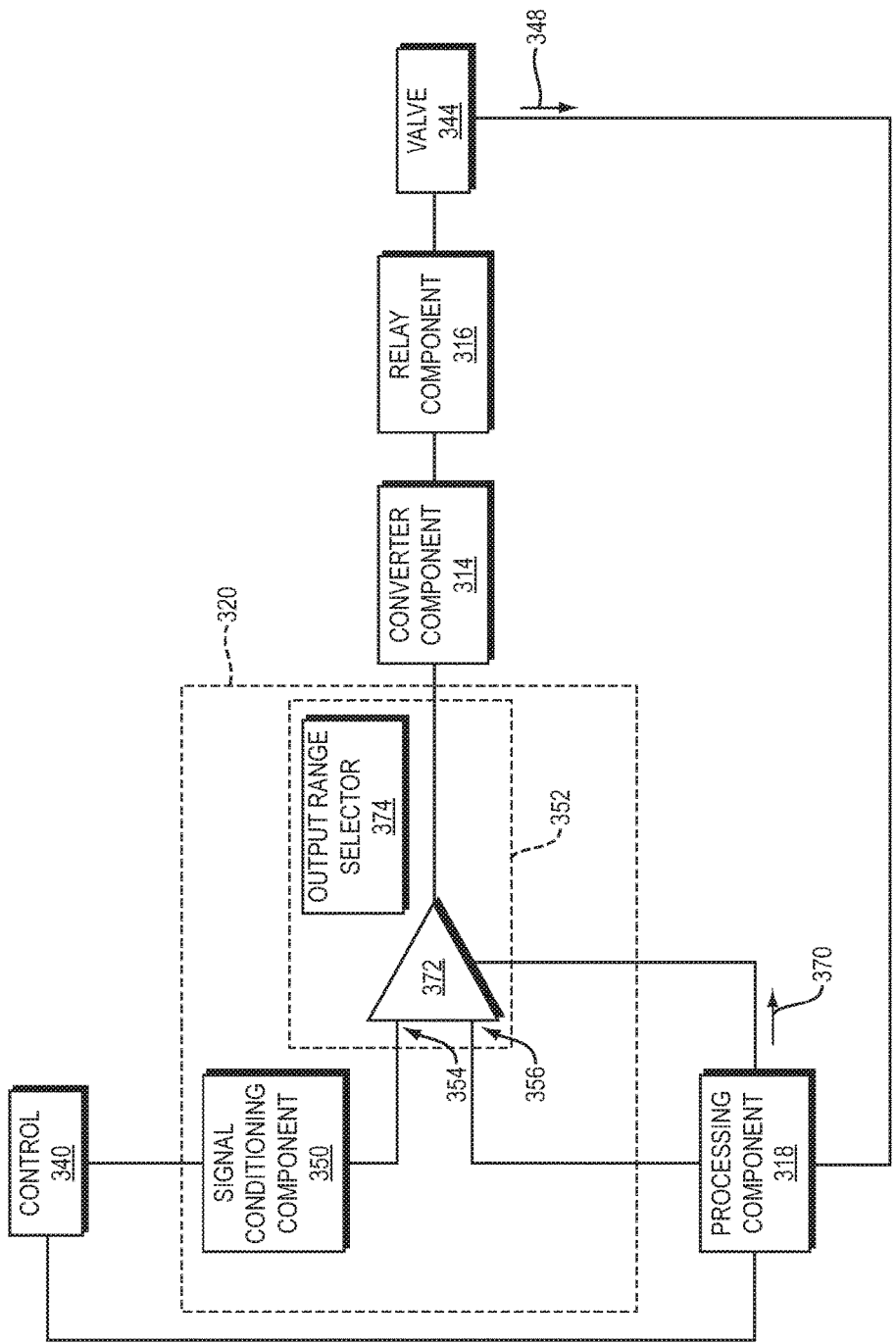
FIG. 4 depicts a schematic diagram of an exemplary embodiment of a valve positioner for use with a control valve (e.g., the control valve of FIG. 1)

FIG. 4 illustrates a schematic diagram of an exemplary embodiment of a valve positioner 200. In the example of FIG. 4, the embodiment includes a converter component 314, a relay component 316, a bypass component 320 with a signal condition component 350, and a control 340. The signal switching component 352 includes an operational amplifier 372 and an output range component 374. Examples of the output range component 374 can include step-up and step-down circuitry with conventional topology to adjust the output of the signal switching component 352. These types of circuitry, in combination with the operational amplifier 372, can scale the output of the signal switching component 352 to match the operating range (e.g., the pneumatic range) of the valve 344. This feature provides adequate control over the mechanical range of the valve 344 in the event that the processing component 318 fails and, accordingly, feedback signals (e.g., the first feedback signal 348) are no longer available to monitor the position of the valve 344 as desired. Examples of the operational amplifier 372 can receive the input control signal, e.g., at the first input 354 and the second input 356, and a power input (e.g., operating signal 370) from the processing component 318.

Figure 5:
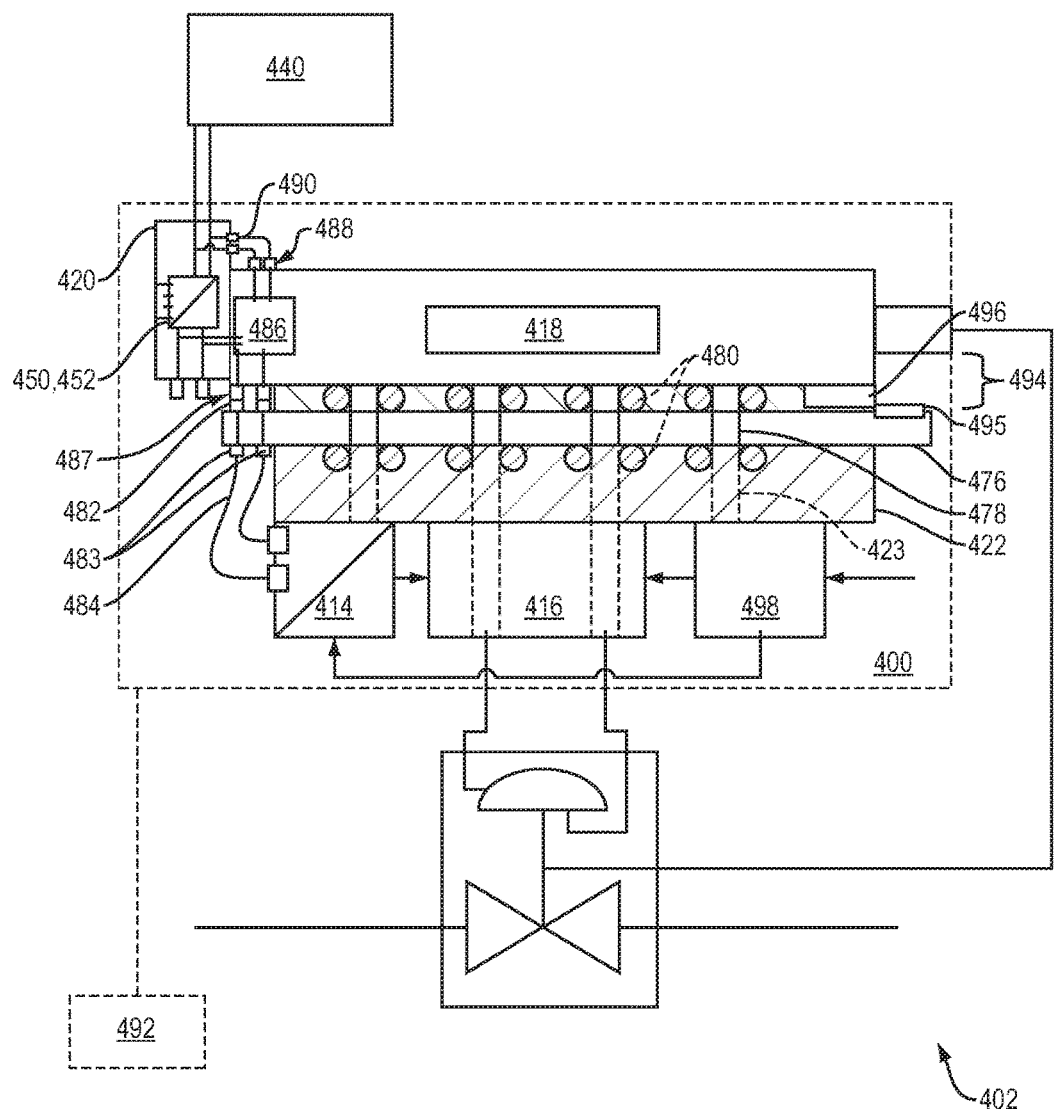
FIG. 5 depicts a schematic diagram of an exemplary embodiment of a valve positioner for use with a control valve (e.g., the control valve of FIG. 1)
Figure 6:
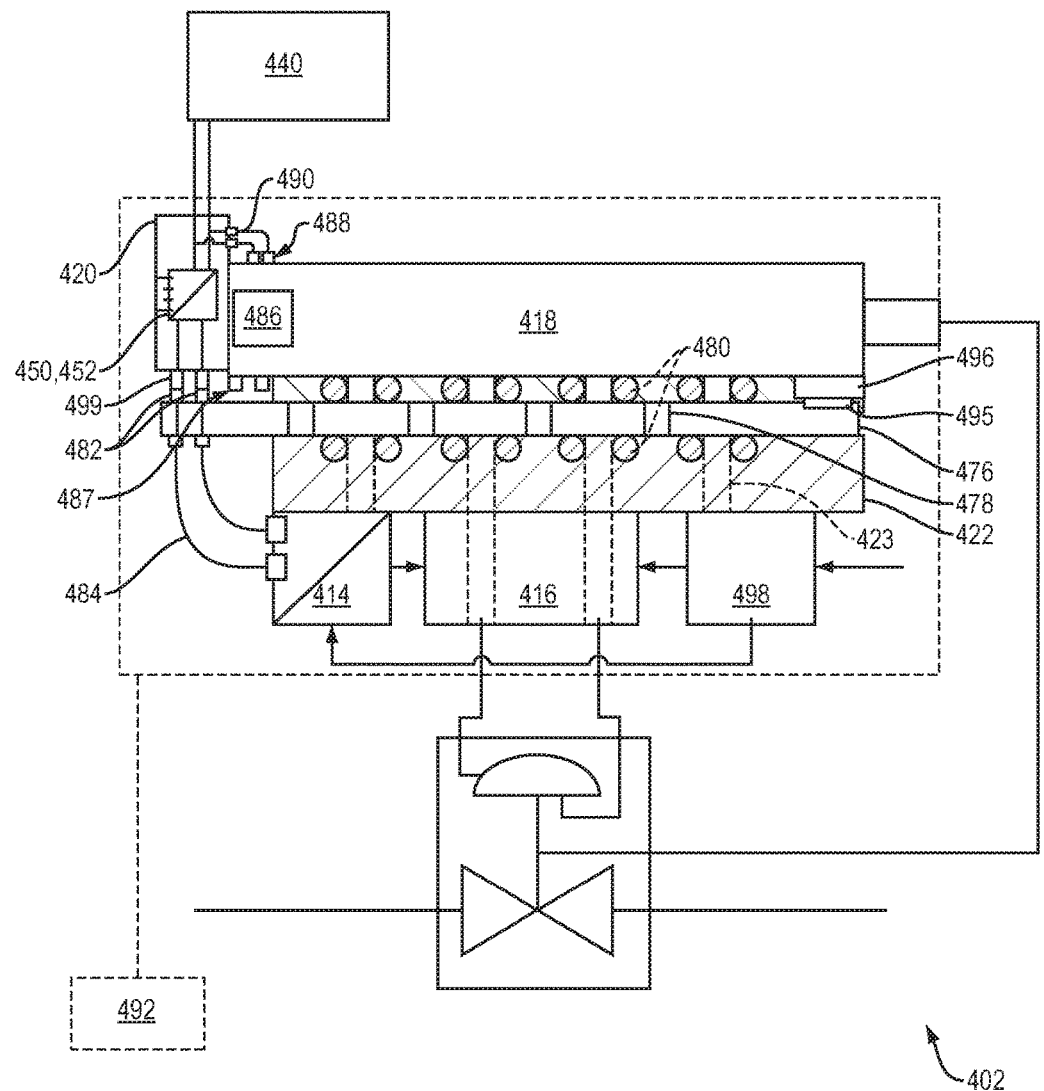
FIG. 6 depicts the valve positioner of FIG. 5 with an example of a manifold element in a position that corresponds to a by-pass mode of operation.
Figure 7:
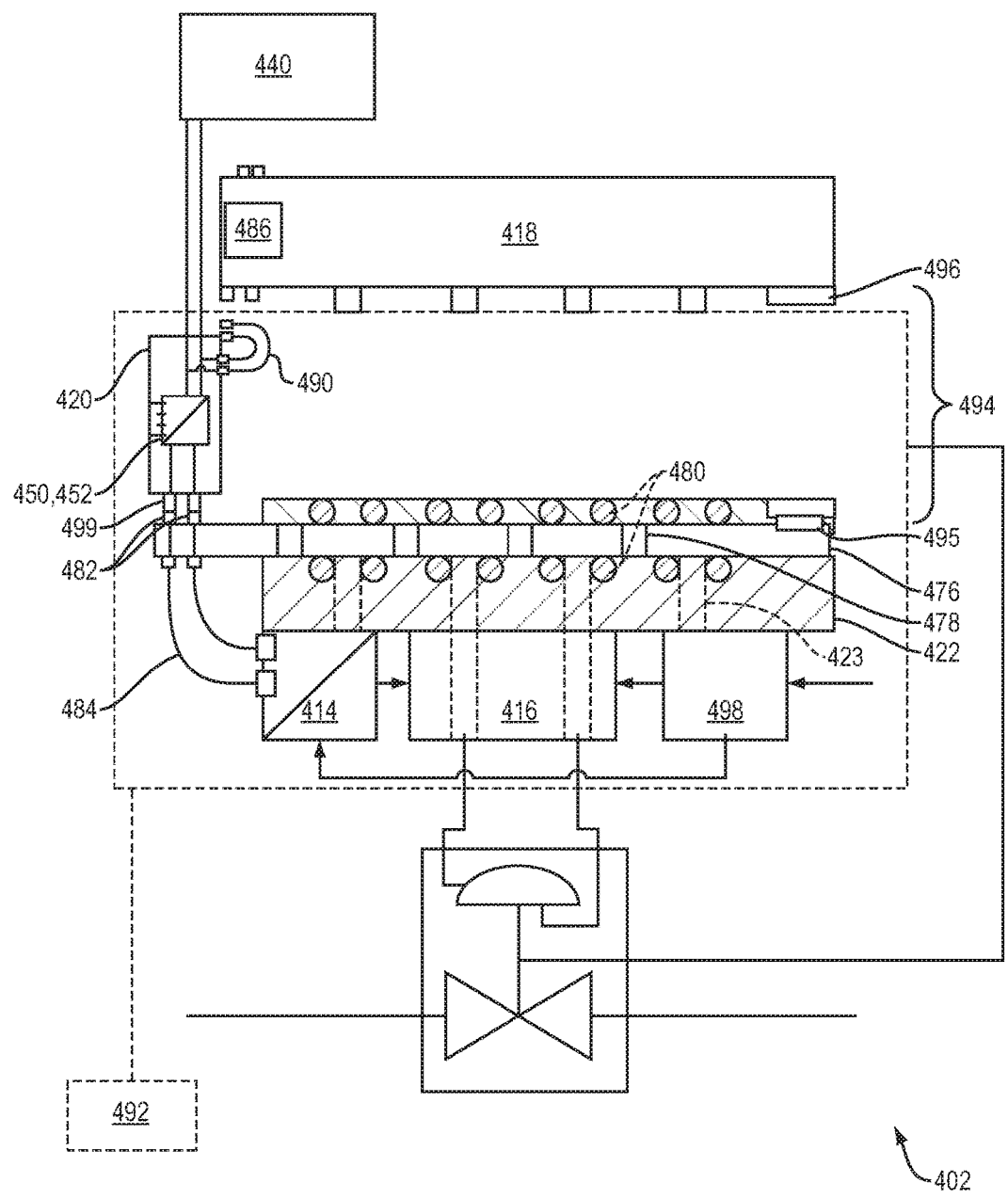
FIG. 7 depicts the valve positioner of FIG. 6 with an example of a processing component separated from the valve positioner.

FIGS. 5, 6, and 7 illustrate one implementation of the by-pass features that allow for on-line maintenance and repair to occur without the need to take the valve-under-maintenance offline. FIG. 5 illustrates a schematic diagram of an exemplary embodiment of a valve positioner 400 that is part of a valve 402, shown in a normal operating state. The diagram in FIG. 6 provides an example of the valve 402 in a by-pass condition that utilizes the by-pass component 420 to continue to conduct control signals between the converter component 414 and the remote device 450. This feature preserves operation of the valve 402 to modulate flow of a working fluid. As shown in FIG. 7, configurations of the valve positioner 400 also allow the processor 418 to separate from the housing 422, e.g., as might happen during maintenance to swap and/or replace the processor 418.

In FIG. 5, the valve positioner 400 includes a manifold element 476 with one or more openings 478 and corresponding gasket elements 480 disposed on either side of the manifold element 476. The manifold element 476 may incorporate a signal connection element that includes a top-side connector 482 found on the top side (also "first side") of the manifold element 476 and a bottom-side connector 483 found on the bottom side (also "second side") of the manifold element 476. The signal connection element can couple with the converter component 414 via cable 484 that extends from the bottom-side connector 483. In one embodiment, the valve positioner 400 also has a relay assembly with a relay component 486, and connectors (e.g., a first connector 487 and a second connector 488). A cable 490 can couple with the second connector 488 and with connectors on the by-pass component 420. The valve positioner 400 can also include a bypass switch element 492 and a manifold position sensor 494, which in one example includes a magnet 495 and a hall effect sensor 496.

Construction of the valve positioner 400 permits the manifold element 476 to move relative to the processing component 418 and/or the housing component 422. This construction may incorporate slides, rollers, bearings, and like elements that afford low friction coupling, e.g., of the manifold element 476 with one or more parts of the housing element 422. Examples of the gasket elements 480 include o-rings and like devices that can create a seal between the surfaces of the manifold element 476 and housing element and/or the processing component 418. Formation of this seal may prevent fluid from migrating from the manifold openings 478, while reducing the number of points of contact with the manifold element 476 that might restrict and/or prevent movement.

This configuration of components can allow the manifold element 478 to change position, e.g., from a first position (shown in FIG. 5) to a second position that is different from the first position. The different positions regulate flow of fluid (e.g., air) between the processing component 418 and one or more of the converter component 414, the relay component 416, and a regulator 498. In one implementation, when the valve 402 operates in the normal operating state, the manifold element 478 can assume the first position to allow fluid to flow from the housing openings 423 to the processing component 418 via openings 478. In this first position, the signal connection element on the manifold element 476 couples with the relay element 486. This connection allows signals to conduct from the remote device 440 to the converter component 414 via the processing component 418. In one example, these signals travel along a signal path that includes the relay element 486, the signal connection element on the manifold element 476, and the cable 484.

Use of the by-pass switch element 492 can initiate and/or facilitate the change in position of the manifold element 476. Examples of the by-pass switch element 492 may include one or more switches (e.g., toggle, push button, etc.) and other devices that can cause the manifold element 476 to move, e.g., between the first position and the second position. In one implementation, these devices actuate in response to physical contact to affect motion of the manifold element 476. This feature of the element 492 may require the presence of a technician to initiate the by-pass condition and provide maintenance, as contemplated herein. However, this disclosure also contemplates other configurations of elements and components that would allow automated actuation of the by-pass switch element 492, e.g., in response to signals that originate remote from the valve 402. These configuration might respond, for example, to signals from the remote device 440 that cause the by-pass switch element 492 to change the position of the manifold element 476 between the first position and the second position.

FIG. 6 illustrates an example of a second position for the manifold element 476. In this example, the change in position of the manifold element 476 misaligns the manifold openings 423 and the openings 478. This configuration prevents the flow of fluid, e.g., between the processing component 418 and components 414, 416, 498. The change in position of the manifold element 476 also decouples the signals connection element on the manifold element 476 from the relay element 486. In one example, the signal connection element on the manifold element 478 couples with the by-pass component 420 via connection 499 in the second position. Examples of the connection 499 allow signals to conduct from the by-pass component 420 to the converter component 414 without passing through the processing component 418. This feature preserves operation of the valve 402, while placing the valve positioner 400 in condition to allow the processing component 418 to separate, e.g. from the housing element 422.

FIG. 7 illustrates one exemplary configuration for the valve positioner 400 to show the separation of the processing component 418 from the housing element 422. This separation may occur during maintenance to repair and/or replace the processing component 418. In one implementation, a technician can actuate the by-pass switch element 492 to change the position of the manifold element 476 from the first position to the second position. This step places the valve positioner 400 in the by-pass condition, which permits the valve 402 to continue to operate, e.g., to modulate the flow of fluid in response to signals from the remote device 440. During the remaining maintenance procedure, the technician may decouple the cable 490 from the processing component 418. The technician may then grasp the processing component 418 and, in one example, apply sufficient force on the processing component 418 to extract the processing component 418 from the housing element 422. In one procedure, the technician may replace the processing component 418 in the housing 422, reconnect the cable 490, and replace and/or reconnect any other miscellaneous components as necessary. The technician may then actuate the by-pass switch element 492 to re-position the manifold element 476 in the first position to re-initiate normal operation of the valve positioner 400. During re-initiation, the valve positioner 400 may pole the manifold positioner sensor 494 to ensure that the manifold element 476 returns to the first position.

In light of the foregoing discussion, examples of the by-pass component expand the functionality of control valves to continue operation during maintenance and repair. This feature allows the control valve to remain on-line and, more importantly, to continue to modulate fluid flow as necessary to maintain process conditions as though the control valve is operating normally. Moreover, designs for the by-pass component proposed herein offer process operators an option to realize the benefits (e.g., expanded processing power, data collection and feedback, etc.) of valve positioners and control valves, while addressing potential reliability that might otherwise result in downtime and loss of process productivity in devices that do not utilize the by-pass component therein.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit for use in a valve positioner to control operation of a valve, the circuit comprising:
   a processor;
   a switch coupled with the processor to receive an input power signal and an operating signal from the processor; and
   a current-to-pressure converter coupled to the switch, wherein the processor is operative to:
    receive a feedback signal having a value that defines an operating parameter for the valve, and
    generate the operating signal having a level corresponding to the value of the feedback signal,
wherein the switch is operative to change between a first state and a second state in response to the level of the operating signal so as to conduct the input power signal to the current-to-pressure converter from the processor in the first state or from a source different from the processor in the second state.

2. The circuit of claim 1, further comprising:
a signal conditioning component coupled with the switch, the signal conditioning component operative to,
receive a control signal from a remote device;
generate the input power signal using the control signal, the input power signal having properties to operate the current-to-pressure converter.

3. The circuit of claim 2, wherein the signal conditioning component is configured to modify the control signal so that the input power signal has analog properties.

4. The circuit of claim 1, further comprising:
a sensor that provides the feedback signal corresponding to position of the valve.

5. The circuit of claim 1, further comprising:
a sensor that provides the feedback signal corresponding to travel of the valve.

6. The circuit of claim 1, further comprising:
a sensor that provides the feedback signal corresponding to flow properties of material through the valve.

7. The circuit of claim 1, wherein the processor is operative to,
compare the feedback signal to a threshold criteria; and
change the level in response to a relationship between the feedback signal and the threshold criteria.

8. The circuit of claim 1, wherein the switch operates in the second state in response to failure of the processor.

9. The circuit of claim 1, wherein the second state decouples the processor from the current-to-pressure converter.

10. The circuit of claim 1, wherein the processor may be removed from the circuit with the switch in the second state.

* * * * *